United States Patent
Barnes et al.

(10) Patent No.: US 10,419,657 B2
(45) Date of Patent: Sep. 17, 2019

(54) SWARM APPROACH TO CONSOLIDATING AND ENHANCING SMARTPHONE TARGET IMAGERY BY VIRTUALLY LINKING SMARTPHONE CAMERA COLLECTORS ACROSS SPACE AND TIME USING MACHINE-TO MACHINE NETWORKS

(71) Applicant: GALILEO GROUP, INC., Melbourne, FL (US)

(72) Inventors: Donald Michael Barnes, Melbourne, FL (US); James Michael Grichnik, Miami Beach, FL (US)

(73) Assignee: Galileo Group, Inc., Melbourne, FL (US)

( * ) Notice: Subject to any disclaimer, the term of this patent is extended or adjusted under 35 U.S.C. 154(b) by 0 days.

(21) Appl. No.: 15/521,578

(22) PCT Filed: Oct. 26, 2015

(86) PCT No.: PCT/US2015/057419
§ 371 (c)(1),
(2) Date: Apr. 24, 2017

(87) PCT Pub. No.: WO2016/069496
PCT Pub. Date: May 6, 2016

(65) Prior Publication Data
US 2018/0278827 A1 Sep. 27, 2018

Related U.S. Application Data

(60) Provisional application No. 62/209,787, filed on Aug. 25, 2015, provisional application No. 62/206,754, (Continued)

(51) Int. Cl.
*G06T 15/00* (2011.01)
*H04N 5/232* (2006.01)
(Continued)

(52) U.S. Cl.
CPC ..... *H04N 5/23206* (2013.01); *G01C 19/5776* (2013.01); *G06F 16/58* (2019.01);
(Continued)

(58) Field of Classification Search
CPC ............. G11B 27/32; H04N 2201/216; H04N 1/2166; H04N 1/2187; H04N 1/32122;
(Continued)

(56) References Cited

U.S. PATENT DOCUMENTS 6,021,344 A * 2/2000 Lui ...................... A61B 5/0059
351/159.3
6,427,022 B1 * 7/2002 Craine ................. A61B 5/0059
128/922

(Continued)

OTHER PUBLICATIONS

International Search Report and Written Opinion for International Patent Application No. PCT/US2015/057419, dated Feb. 9, 2016, 21 pages.

*Primary Examiner* — Phu K Nguyen
(74) *Attorney, Agent, or Firm* — Morgan, Lewis & Bockius LLP

(57) ABSTRACT

At a first computer-enabled imaging device in a plurality of computer-enabled imaging devices, a first workflow including time-stamped images of a region of interest is obtained during a first time interval, and first meta data is associated with the second workflow. The first meta data includes positional and orientation data, the first time interval, and an identity of the first computer-enabled imaging device. Control signals are generated based on a characteristic of the first workflow, and then communicated to a second computer-enabled imaging device. In accordance with the control signals, the second computer-enabled imaging device obtains a second workflow including time-stamped images of the region of interest, and associates second meta data with the second workflow. A central system, or any com-
(Continued)

puter-enabled imaging device in the plurality, consolidates the first and second workflows into a consolidated workflow for the region of interest using the first and second meta data.

20 Claims, 10 Drawing Sheets

Related U.S. Application Data filed on Aug. 18, 2015, provisional application No. 62/203,310, filed on Aug. 10, 2015, provisional application No. 62/068,738, filed on Oct. 26, 2014.

(51) Int. Cl.
| | |
|---|---|
| G06F 16/58 | (2019.01) |
| G06T 7/73 | (2017.01) |
| G01C 19/5776 | (2012.01) |
| G06T 7/40 | (2017.01) |
| G06T 15/04 | (2011.01) |
| G06T 15/08 | (2011.01) |
| G06T 17/20 | (2006.01) |
| G06K 9/32 | (2006.01) |
| G06K 9/46 | (2006.01) |
| G06K 9/62 | (2006.01) |
| H04W 4/70 | (2018.01) |

(52) U.S. Cl.
CPC ............ *G06K 9/3208* (2013.01); *G06K 9/46* (2013.01); *G06K 9/6251* (2013.01); *G06T 7/40* (2013.01); *G06T 7/74* (2017.01); *G06T 15/04* (2013.01); *G06T 15/08* (2013.01); *G06T 17/20* (2013.01); *H04N 5/23219* (2013.01); *H04W 4/70* (2018.02); *G06T 2200/04* (2013.01); *G06T 2200/08* (2013.01); *G06T 2207/10028* (2013.01); *G06T 2207/30196* (2013.01); *G06T 2207/30241* (2013.01); *G06T 2207/30244* (2013.01); *G06T 2215/16* (2013.01)

(58) Field of Classification Search
CPC .... H04N 5/76; H04N 7/0122; H04N 7/17318; H04N 21/25875; H04N 21/4143; H04N 21/4627; H04N 21/472; H04N 2101/00; H04N 2201/212
USPC .......................................................... 345/418
See application file for complete search history.

(56) References Cited

U.S. PATENT DOCUMENTS

| | | | | |
|---|---|---|---|---|
| 6,608,628 | B1 * | 8/2003 | Ross | G06T 17/20 345/619 |
| 6,671,737 | B1 * | 12/2003 | Snowdon | H04W 8/24 709/229 |
| 7,213,766 | B2 * | 5/2007 | Ryan | G06F 13/385 235/472.02 |
| 7,233,693 | B2 * | 6/2007 | Momma | A61B 5/0064 382/162 |
| 8,543,519 | B2 * | 9/2013 | Guyon | G06N 99/005 706/12 |
| 8,743,219 | B1 | 6/2014 | Bledsoe | |
| 8,903,568 | B1 | 12/2014 | Wang | |
| 9,019,383 | B2 * | 4/2015 | Jung | H04N 1/00137 348/207.1 |
| 9,280,038 | B1 | 3/2016 | Pan et al. | |
| 9,380,275 | B2 | 6/2016 | Davidson et al. | |
| 9,599,993 | B2 | 3/2017 | Kumar | |
| 9,606,535 | B2 | 3/2017 | Humenay | |
| 9,663,244 | B2 | 5/2017 | Zhao et al. | |
| 9,678,506 | B2 | 6/2017 | Bachrach | |
| 9,688,399 | B1 | 6/2017 | Dobbins | |
| 9,738,380 | B2 | 8/2017 | Claridge et al. | |
| 9,798,322 | B2 | 10/2017 | Bachrach et al. | |
| 9,942,511 | B2 * | 4/2018 | Jung | H04N 7/0117 |
| 10,003,762 | B2 * | 6/2018 | Jung | H04N 21/8153 |
| 2007/0052856 | A1 * | 3/2007 | Jung | H04N 1/2166 348/565 |
| 2009/0318815 | A1 | 12/2009 | Barenes | |
| 2012/0233000 | A1 | 9/2012 | Fisher et al. | |
| 2013/0100128 | A1 | 4/2013 | Steedly et al. | |
| 2013/0101223 | A1 | 4/2013 | Kawanishi et al. | |
| 2013/0136341 | A1 | 5/2013 | Yamamoto | |
| 2013/0222369 | A1 * | 8/2013 | Huston | G06T 17/00 345/419 |
| 2013/0293686 | A1 | 11/2013 | Blow et al. | |
| 2014/0012459 | A1 | 1/2014 | Kramer et al. | |
| 2014/0139639 | A1 | 5/2014 | Wagner et al. | |
| 2014/0257595 | A1 | 9/2014 | Tillman | |
| 2014/0313303 | A1 * | 10/2014 | Davis | A61B 5/68 348/77 |
| 2015/0134143 | A1 | 5/2015 | Willenborg | |
| 2016/0139595 | A1 | 5/2016 | Yang et al. | |
| 2018/0095464 | A1 | 4/2018 | Takayama et al. | |

* cited by examiner

Generate one or more control signals, wherein the one or more control signals are based at least in part on a characteristic of the first workflow or a characteristic of the region of interest measured by the first workflow —518

(B)

The one or more control signals include instructions for causing the obtaining of respective workflows and the associating of respective meta data by the first client device and/or the second client device to be performed in accordance with one or more additional regions of interest of the subject corresponding to the characteristic upon which the one or more control signals were generated —536

The one or more additional regions of interest include regions of interest for which insufficient image data and/or meta data was captured by the first client device —538

The instructions include instructions for obtaining the respective workflows of the one or more additional regions of interest at an increased image resolution —540

The one or more control signals include instructions for causing the obtaining of respective workflows and the associating of respective meta data by the first client device and the second client device to be performed synchronously —542

The one or more control signals include instructions for causing obtaining of a second workflow to commence —546

The one or more control signals include instructions for causing the obtaining of the second workflow and associating of second meta data at a second client device to continue after the first client device ceases the obtaining of the first workflow and the associating of the first meta data —548

SWARM APPROACH TO CONSOLIDATING AND ENHANCING SMARTPHONE TARGET IMAGERY BY VIRTUALLY LINKING SMARTPHONE CAMERA COLLECTORS ACROSS SPACE AND TIME USING MACHINE-TO MACHINE NETWORKS

CROSS-REFERENCE TO RELATED APPLICATIONS

This application is a National Stage of International Patent Application No. PCT/US2015/057419 filed Oct. 26, 2015 and published as WO 2016/069496 A1, which claims priority to U.S. Provisional Application No. 62/209,787 filed Aug. 25, 2015, U.S. Provisional Application No. 62/206,754 filed Aug. 18, 2015, U.S. Provisional Application No. 62/203,310 filed Aug. 10, 2015, and U.S. Provisional Application No. 62/068,728 filed Oct. 26, 2014, the entire contents of which applications is incorporated herein for all purposes by this reference.

TECHNICAL FIELD

This relates generally to image processing and informatics, including but not limited to capturing and consolidating image data using multiple sensor devices and dynamic control signals.

BACKGROUND

The use of imaging technology for analyzing surface structures has a number of broad biomedical and non-biological applications, ranging from medical imaging and disease detection, to verifying the integrity of building structures. Despite significant advances in the processing and imaging capabilities of consumer devices, imaging technology and equipment enabling this surface imaging and analysis functionality has traditionally been prohibitively costly and impractical for adoption by the broad consumer demographic. While the simultaneous use of multiple devices to capture comprehensive data sets would be ideal, currently lacking is the ability to effectively and efficiently coordinate and synchronize operational capabilities across devices to ensure adequate and meaningful data capture. Furthermore, mechanisms for aggregating subject data on a large scale for enhanced surface informatics based detection also remain substantially undeveloped.

SUMMARY

Accordingly, there is a need for faster, more efficient methods, systems, devices, and interfaces for capturing and consolidating image data using sensor devices and dynamic control signals. Images and associated meta data of a particular subject may be captured by utilizing the robust sensing capabilities of sensor devices, such as smart phones equipped with cameras, accelerometers, and gyroscopes. Based on identified characteristics of the captured data, control signals can be generated and sent to other nearby sensor devices to optimize the data capture session, such as capturing additional images of a targeted region, or additional images of the subject from unobstructed angles. The collection of data captured may then be consolidated for further processing, analysis, or display. Such methods and interfaces optionally complement or replace conventional methods for capturing and consolidating image data using sensor devices.

In accordance with some embodiments, a method is performed at a first computer-enabled imaging device (e.g., a first client device/sensor device, such as a smart phone) in a plurality of computer-enabled imaging devices. The first computer-enabled imaging device having one or more processors, a first two-dimensional pixilated detector, and memory for storing one or more programs for execution by the one or more processors. The method includes obtaining a first workflow comprising a first plurality of time-stamped two-dimensional pixilated images of a region of interest of a subject during a first time interval. First meta data is associated with the first workflow, wherein the first meta data comprises (i) a plurality of first positions and a plurality of first orientations of the first computer-enabled imaging device indicating first positional and orientation data for the first computer-enabled imaging device during the first time interval, (ii) an indication of the first time interval, and (iii) an identity of the first computer-enabled imaging device. One or more control signals are generated, wherein the one or more control signals are based at least in part on a characteristic of the first workflow or a characteristic of the region of interest measured by the first workflow. The one or more control signals are then communicated to a second computer-enabled imaging device in the plurality of computer-enabled imaging devices across a network. The second computer-enabled imaging device includes one or more processors, a second two-dimensional pixilated detector, and memory for storing one or more programs for execution by the one or more processors, the one or more programs executed in accordance with the one or more control signals received across the network. In accordance with the one or more control signals, the second computer-enabled imaging device obtains a second workflow comprising a second plurality of time-stamped two-dimensional pixilated image of the region of interest at a second time interval. Second meta data is associated with the second workflow, wherein the second meta data comprises (i) a plurality of second positions and a plurality of second orientations of the second computer indicating second positional and orientation data for the second computer-enabled imaging device during the second time interval, (ii) an indication of the second time interval, and (iii) an identity of the second computer-enabled imaging device. Furthermore, at a central system or any computer-enabled imaging device in the plurality of computer-enabled imaging devices, the first and second workflows are consolidated into a consolidated workflow for the region of interest using the first and second meta data.

In accordance with some embodiments, a computer-enabled imaging device includes a processor and memory for storing one or more programs for execution by the processor, the one or more programs including instructions for performing any of the operations described above.

In accordance with some embodiments, a central system includes a processor and memory for storing one or more programs for execution by the processor, the one or more programs including instructions for performing any of the operations described above.

In accordance with some embodiments, a computer-readable storage medium storing one or more programs for execution by one or more processors, the one or more programs including instructions for performing any of the operations described above.

Thus, computer-enabled imaging devices are provided with faster, more efficient methods for capturing and consolidating image data, thereby increasing the value, effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 5A-5F are flow diagrams illustrating a method for capturing and consolidating image data using multiple client devices and dynamic control signals, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first smart phone could be termed a second smart phone, and, similarly, a second smart phone could be termed a first smart phone, without departing from the scope of the various described embodiments. The first smart phone and the second smart phone are both smart phones, but they are not the same smart phone.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
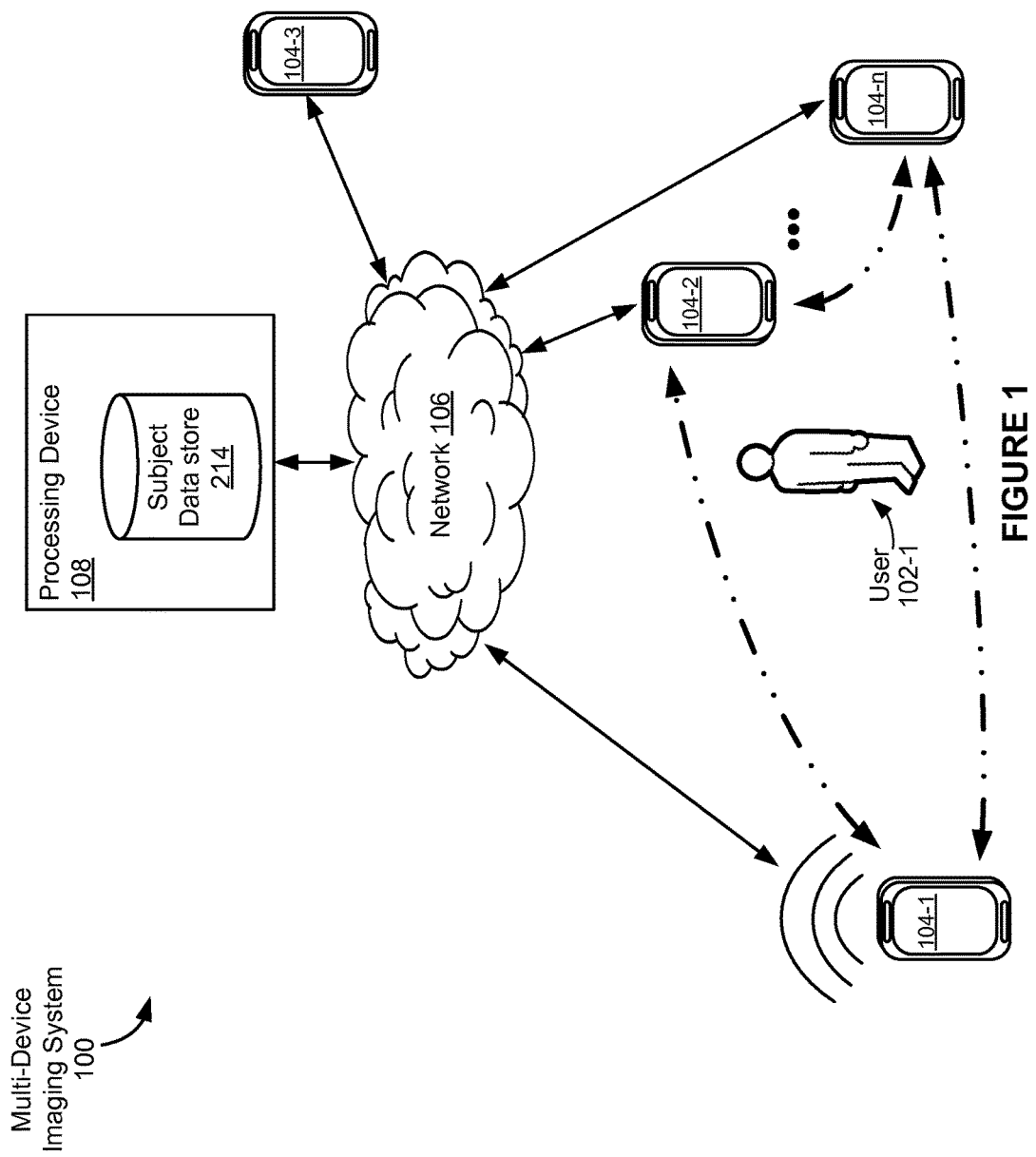
FIG. 1 is a block diagram illustrating an exemplary multi-device imaging system, in accordance with some embodiments.

FIG. 1 is a block diagram illustrating a multi-device imaging system 100, in accordance with some embodiments. The imaging system 100 includes a number of client devices (also called "computer-enabled imaging devices," "client systems," "client computers," or "clients") 104-1, 104-2, 104-3 . . . 104-n and a processing device 108 (also called a central system) communicably connected to one another by one or more networks 106 (e.g., the Internet, cellular telephone networks, mobile data networks, other wide area networks, local area networks, metropolitan area networks, and so on).

In some embodiments, the one or more networks 106 include a public communication network (e.g., the Internet and/or a cellular data network), a private communications network (e.g., a private LAN or leased lines), or a combination of such communication networks. In some embodiments, the one or more networks 106 use the HyperText Transport Protocol (HTTP) and the Transmission Control Protocol/Internet Protocol (TCP/IP) to transmit information between devices or systems. HTTP permits client devices to access various resources available via the one or more networks 106. In some embodiments, the one or more networks 106 are wireless communications channels based on various custom or standard wireless communications protocols (e.g., IEEE 802.15.4, Wi-Fi, ZigBee, 6LoWPAN, Thread, Z-Wave, Bluetooth Smart, ISA100.11a, WirelessHART, MiWi, etc.), or any other suitable communication protocol, including communication protocols not yet developed as of the filing date of this document. Alternatively, in some embodiments, at least a portion of the one or more networks 106 comprise physical interfaces based on wired communications protocols (e.g., Ethernet, USB, etc.). Although all devices are illustrated as being interconnected through the network 106, in some implementations, any of the aforementioned devices or systems are communicably connected with each other either directly (i.e., device-to-device) or through a network device (e.g., a router represented by network 106), or with only a subset of the other devices of the imaging system 100, via any combination of the aforementioned networks 106 (e.g., client devices 104 communicate with one another via Bluetooth, transmit time-stamped images to the processing device 108 via a cellular network, and receive control signals from the control device 110 via Wi-Fi). The various embodiments of the invention, however, are not limited to the use of any particular communication protocol.

In some embodiments, the client devices 104-1, 104-2, . . . 104-n are computing devices such as cameras, video recording devices, smart watches, personal digital assistants, portable media players, smart phones, tablet computers, 2D devices, 3D (e.g., virtual reality) devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to capture various types of data (e.g., multimedia, such as image, video, and/or audio data; meta data; etc.), as well as communicate with other client devices 104 and/or the processing device 108.

In some embodiments, client devices are configured to be mounted on or attached to various apparatuses/platforms which affect and dictate a motion of the client device during data capture. Client devices may, for example, be fixed to structures (e.g., walls, ceilings), attached to vehicles (e.g., bikes, automobiles, planes, drones, etc.), and/or attached to humans/animals (e.g., via clothing, helmets, collars) to record subjects or activities in a multidimensional manner (e.g., spatially and temporally). In some embodiments, mobile apparatuses to which client devices are mounted include one or more processors and memory storing instructions (e.g., received control signals, pre-programmed flight patterns, flight instructions, etc.) for execution by the one or more processors. In some embodiments, mobile apparatuses include at least some of the same operational capabilities and features of the client devices 104, which may be used additionally, alternatively, and/or in conjunction with the client devices 104 (e.g., drone devices include additional sensors that may be used in conjunction with sensors of the client devices 104). In some embodiments, the first client device is fixedly mounted to the mobile apparatus (e.g., drone) such that sensor readings by the first client device are substantially representative of environmental conditions associated with the mobile apparatus. For example, sensor readings obtained by the first client device that indicate an orientation of the first client device, also indicate an orientation of a mobile apparatus to which the first client device is mounted. In other words, in some embodiments, because the first client device and the mobile apparatus are fixedly mounted, their respective orientations are substantially the same. Similarly, as another example, a location of the first client device (derived from sensor readings acquired by the first client device) is substantially the same as a location of the mobile apparatus.

Client devices 104 (which may be mounted to respective mobile apparatuses) may be deployed to obtain or generate data for a designated subject (e.g., human subject, such as user 102-1) or a region of interest (e.g., facial region of a human subject, crop fields, urban landscapes, etc.) for later processing and analysis (e.g., transmitting captured data to a processing device 108 and/or other client devices for processing). Client devices 104 may also be configured to receive, display, and/or manipulate data (e.g., data generated, obtained, or produced on the device itself, consolidated workflows received from the processing device 108 or other client devices, etc.). In some embodiments, the client devices 104 (and/or respective mobile apparatuses) capture multimedia data (e.g., time-stamped images, video, audio, etc.), and associate respective meta data (e.g., environmental information (time, geographic location), device readings (sensor readings from accelerometers, gyroscopes, barometers), etc.) with the captured multimedia data. After the captured data is processed (e.g., by a processing device 108, client devices 104, etc.), the same or other client devices 104 may subsequently receive data from the processing device 108 and/or other client devices for display (e.g., temporally, spectrally, and/or spatially consolidated workflows, including two or three-dimensional maps, point clouds, textured maps, etc.).

Client devices 104 also serve as control devices for synchronizing operational processes with those of one or more other devices. For instance, in some embodiments, one or more client devices 104 are used to dynamically generate control signals for transmission to other devices (e.g., client devices 104, respective mobile apparatuses, etc.) for synchronized data capture (e.g., synchronous image/meta data capture with respect to temporal, spatial, or spectral parameters). Control signals include instructions executable by a receiving device (e.g., client device 104, mobile apparatus) that modify parameters of a mobile pattern (e.g., a flight line/positioning of a drone) or capture parameters (e.g., increased image resolution, data capture start/end time, etc.). Control signals are sometimes generated based on identified characteristics of a workflow of images obtained by a client device (e.g., an identified area that was obstructed in the previous images). As an example, one or more client devices 104 generate control signals for time-synchronized image capture of a particular subject using multiple client devices 104 across a predefined period of time (e.g., multiple client devices 104 having different positions or orientations with respect to a subject capturing a workflow of images at the same frequency), or at specified intervals of time (e.g., each of multiple client devices 104 capturing a stream of images of the same subject each day for a week). In some embodiments, control signals are also be synchronized by spatial parameters of the client devices 104 with respect to a subject, an environment, or one another (e.g., image capture synchronized such that images are captured from known positions and orientations with reference to a subject). Moreover, in some embodiments control signals are synchronized with respect to spectral aspects of a subject or environment (e.g., identifying a common feature among images captured by different client devices 104, and synchronizing image capture based on the identified feature). Control signals are described in greater detail with respect to the method 500 of FIGS. 5A-5F.

The processing device 108 (which, in some embodiments, may itself be a client device 104) stores, processes, consolidates, and/or analyzes data received from one or more devices (e.g., datasets of a subject received from client devices 104, which include multimedia data, associated meta data, etc.). The resulting data of such processing and analysis are in turn disseminated to the same and/or other devices for viewing, manipulation, and/or further processing and analysis. In some embodiments, the processing device 108 consolidates data received from one or more client devices 104 and performs one or more geomatics based processes. For example, using associated meta data, the processing device 108 constructs two or three-dimensional maps (e.g., by matching features identified across workflows, estimating parallax between images, and adding points to a map when a parallax threshold is satisfied), where the constructed maps are used to create dense point clouds and/or generate textured meshes representing a subject. In some embodiments, useful biological or non-biological data is further derived and extracted from visual representations generated by geomatics based processes (e.g., extracting data from the spatial, spectral, and/or temporal representations of subject datasets, such as generated maps, point clouds, and/or meshes). Extracted data can be further processed or analyzed for detection purposes (e.g., detecting a temporally observable change or pre-confirmed condition). In some embodiments, the processing device 108 is a single computing device such as a computer server, while in other embodiments, the processing device 108 is implemented by multiple computing devices working together to perform the actions of a server system (e.g., cloud computing).

In some embodiments, data (e.g., a consolidated workflow) is sent to and viewed by the client devices in a variety of output formats, and/or for further processing or manipulation (e.g., CAD programs, 3D printing, virtual reality displays, holography applications, etc.). In some embodiments, data is sent for display to the same client device that performs the image capture and acquires sensor readings (e.g., client devices 104), and/or other systems and devices (e.g., data apparatus 108, a client device 104-3 that is a dedicated viewing terminal, etc.). In some embodiments, client devices 104 access data and/or services provided by the processing device 108 by execution of various applications. As another example, one or more of the client devices 104-1, 104-2, . . . 104-n execute software applications that are specific to viewing and manipulating data (e.g., surface informatics "apps" running on smart phones or tablets).

Figure 2:
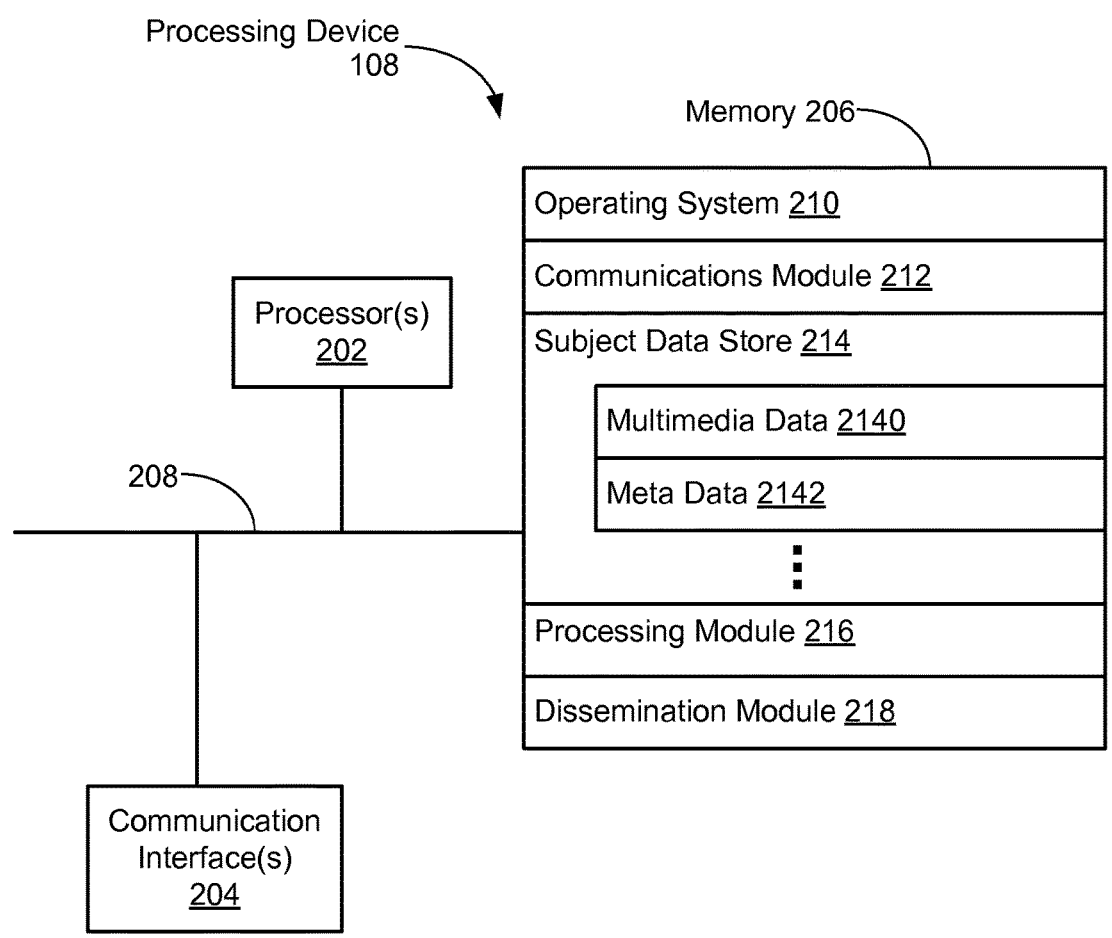
FIG. 2 is a block diagram illustrating an exemplary processing device, in accordance with some embodiments.

FIG. 2 is a block diagram illustrating an exemplary processing device 108, in accordance with some embodiments. In some embodiments, the processing device 108 is a central system, client device (e.g., one or more client devices 104, FIG. 1), processing device apparatus, server system, or any other electronic device for receiving, collecting, storing, consolidating, displaying, and/or processing data received from a plurality of devices over a network (sometimes referred to alternatively as a data processing and display system).

The processing device 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The processing device 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
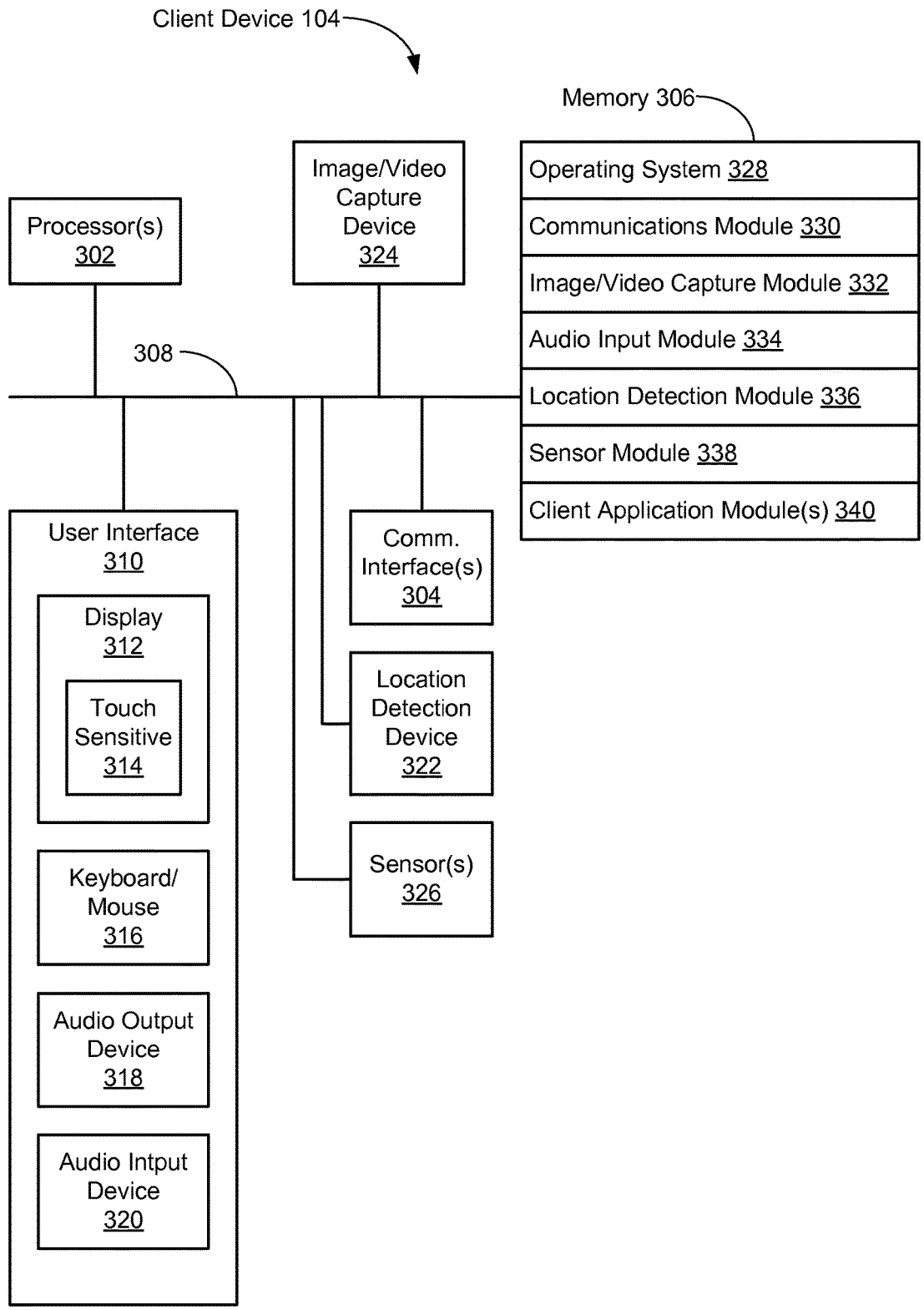
FIG. 3 is a block diagram illustrating an exemplary client device, in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 optionally includes one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the processing device 108 to other computers, systems, and/or client devices 104 via the one or more communication network interfaces 204 (wired or wireless) and one or more communication networks (e.g., the one or more networks 106)
- a subject data store 214 for storing captured data associated with subjects or specific regions of interest thereof, (e.g., captured by one or more client devices 104, FIGS. 1 and 3), such as:
    - multimedia data 2140 for storing multimedia data (e.g., time-stamped images, video, audio, etc.) captured by one or more sensors or devices (e.g., two-dimensional pixilated detector and/or microphone of a client device 104, FIG. 3) of the client devices 104 (and/or mobile apparatuses); and
    - meta data 2142 for storing meta data (e.g., device data, environmental device measurements, and/or other data associated with captured multimedia) acquired by a client device 104 (and/or respective mobile apparatuses), including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixilated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sec2), positional data (e.g., (x, y, z) coordinates of the device with respect to a pre-defined axes or point of reference), orientation data (e.g., roll ($\phi$), pitch ($\theta$), yaw ($\psi$)), and/or any additional sensor or device measurements or readings for determining spatial, spectral, and/or temporal characteristics of a device, region of interest, or imaged subjects/surfaces;
- processing module 216 for processing, manipulating, and analyzing received data (e.g., from one or more client devices 104 and/or drone device 102) in order to identify characteristics of a captured workflow (e.g., areas of insufficient image data), consolidate workflows to generate visualizations of the received data (e.g., a consolidated workflow including a composite image generated based on received time-stamped images and respective sets of meta data), for processing, analyzing, and extracting data (e.g., biological/non-biological feature data and/or temporal data) from generated spatial, spectral, and/or temporal representations of subject datasets (e.g., constructed maps, dense point clouds, meshes, texture-mapped meshes, etc.), and for detecting temporal observable changes and/or conditions (e.g., potential conditions, health conditions, etc.); and
- dissemination module 218 for sending data (e.g., identified characteristics, consolidated workflows, etc.) for viewing and/or further processing.

The subject data store 214 (and any other data storage modules) stores data associated with one or more subjects in one or more types of databases, such as graph, dimensional, flat, hierarchical, network, object-oriented, relational, and/or XML databases, or other data storage constructs.

FIG. 3 is a block diagram illustrating an exemplary client device 104, in accordance with some embodiments.

The client device 104 (e.g., a computer-enabled imaging device, such as a smart phone) typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104.

The client device 104 also optionally includes an image/video capture device 324, such as a camera or webcam. In some embodiments, the image/video capture device 324 includes a two-dimensional pixilated detector/image sensor configured to capture images at one or more predefined resolutions (e.g., a low resolution, such as 480×360, and a high resolution, such as 3264×2448). In some embodiments, the image/video capture device 324 captures a workflow of images (e.g., a stream of multiple images) at a predefined frequency (e.g., 30 Hz). In some embodiments, the client device 104 includes a plurality of image/video capture devices 324 (e.g., a front facing camera and a back facing camera), where in some implementations, each of the multiple image/video capture devices 324 captures a distinct workflow for subsequent processing (e.g., capturing images at different resolutions, ranges of light, etc.). Optionally, the client device 104 includes one or more illuminators (e.g., a light emitting diode) configured to illuminate a subject or environment. In some embodiments, the one or more illuminators are configured to illuminate specific wavelengths of light (e.g., ultraviolet, infrared, polarized, fluorescence, for night time operations when there is less than a threshold level of ambient light, for example), and the image/video capture device 324 includes a two-dimensional pixilated detector/image sensor configured with respect to wavelength(s) of the illuminated light. Additionally and/or alternatively, the image/video capture device 324 includes one or more filters configured with respect to wavelength(s) of the illuminated light (i.e., configured to selectively filter out wavelengths outside the range of the illuminated light).

In some embodiments, the client device 104 includes one or more sensors 326 including, but not limited to, accelerometers, gyroscopes, compasses, magnetometer, light sensors, near field communication transceivers, barometers, humidity sensors, temperature sensors, proximity sensors, lasers, range finders (e.g., laser-based), and/or other sensors/devices for sensing and measuring various environmental conditions. In some embodiments, the one or more sensors operate and obtain measurements at respective predefined frequencies.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 328 that includes procedures for handling various basic system services and for performing hardware dependent tasks, and doing so in accordance with one or more control signals (e.g., operating the image/video capture module 332/sensor module 338 in accordance with modified capture parameters);
- a network communication module 330 that is used for connecting the client device 104 to other computers, systems (e.g., processing device 108), control devices (e.g., control device 110), client devices 104, and/or drone device 102 via the one or more communication network interfaces 304 (wired or wireless) and one or more communication networks (e.g., Internet, cellular telephone networks, mobile data networks, other wide area networks, local area networks, metropolitan area networks, IEEE 802.15.4, Wi-Fi, Bluetooth, etc.);
- an image/video capture module 332 (e.g., a camera module) for processing a respective image or video captured by the image/video capture device 324, where the respective image or video may be sent or streamed (e.g., by a client application module 340) to the processing device 108;
- an audio input module 334 (e.g., a microphone module) for processing audio captured by the audio input device 320, where the respective audio may be sent or streamed (e.g., by a client application module 340) to the processing device 108;
- a location detection module 336 (e.g., a GPS, Wi-Fi, or hybrid positioning module) for determining the location of the client device 104 (e.g., using the location detection device 322) and providing this location information for use in various applications (e.g., client application module 340);
- a sensor module 338 for obtaining, processing, and transmitting meta data (e.g., device data, environmental device measurements, and/or other data associated with captured multimedia) acquired by the client device 104 and/or a respective drone device 102, including but not limited to: device identifiers (e.g., identifying the device of a group of devices that captured the multimedia item, which may include an arbitrary identifier, a MAC address, a device serial number, etc.), temporal data (e.g., date and time of a corresponding capture), location data (e.g., GPS coordinates of the location at which multimedia item was captured), multimedia capture/device settings (e.g., image resolution, focal length, frequency at which images are captured, frequency ranges that a pixilated detector is configured to detect, etc.), sensor frequencies (e.g., the respective frequency at which sensors of a device captured data, such as an accelerometer frequency, a gyroscope frequency, a barometer frequency, etc.), accelerometer readings (e.g., in meters/sec2), positional data (e.g., (x, y, z) coordinates of the device with respect to a predefined axes or point of reference), orientation data (e.g., roll (φ), pitch (θ), yaw (ψ)), and/or any additional sensor or device measurements or readings for determining spatial, spectral, and/or temporal characteristics of a device, region of interest, or imaged subjects/surfaces; and one or more client application modules 340, including the following modules (or sets of instructions), or a subset or superset thereof:

a control module for receiving (e.g., from another client device 104, FIG. 1), generating (e.g., based on characteristics of a workflow), storing, providing, re-broadcasting, and/or operating components of the client device 104 in accordance with control signals;

a web browser module (e.g., Internet Explorer by Microsoft, Firefox by Mozilla, Safari by Apple, or Chrome by Google) for accessing, viewing, and interacting with web sites (e.g., a web site provided by the processing device 108), captured data (e.g., time-stamped images), and/or consolidated workflows of captured data (e.g., composite image); and/or other optional client application modules for viewing and/or manipulating captured data or received data, such as applications for photo management, video management, a digital video player, computer-aided design (CAD), 3D viewing (e.g., virtual reality), 3D printing, holography, and/or other graphics-based applications.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Furthermore, in some implementations, the functions of any of the devices and systems described herein (e.g., client devices 104, processing device 108, etc.) are interchangeable with one another and may be performed by any other devices or systems, where the corresponding sub-modules of these functions may additionally and/or alternatively be located within and executed by any of the devices and systems. As one example, although the client device 104 (FIG. 3) includes sensors and modules for obtaining/processing images (e.g., sensors 326 and an image/video capture module 332) and obtaining respective sets of meta data (e.g., sensor module 338), in some embodiments a mobile apparatus to which the client device 104 is mounted (not illustrated) may include analogous modules, components, and device capabilities for performing the same operations (e.g., sensors and modules containing instructions for obtaining images and respective meta data). The devices and systems shown in and described with respect to FIGS. 1 through 3 are merely illustrative, and different configurations of the modules for implementing the functions described herein are possible in various implementations.

Figure 4:
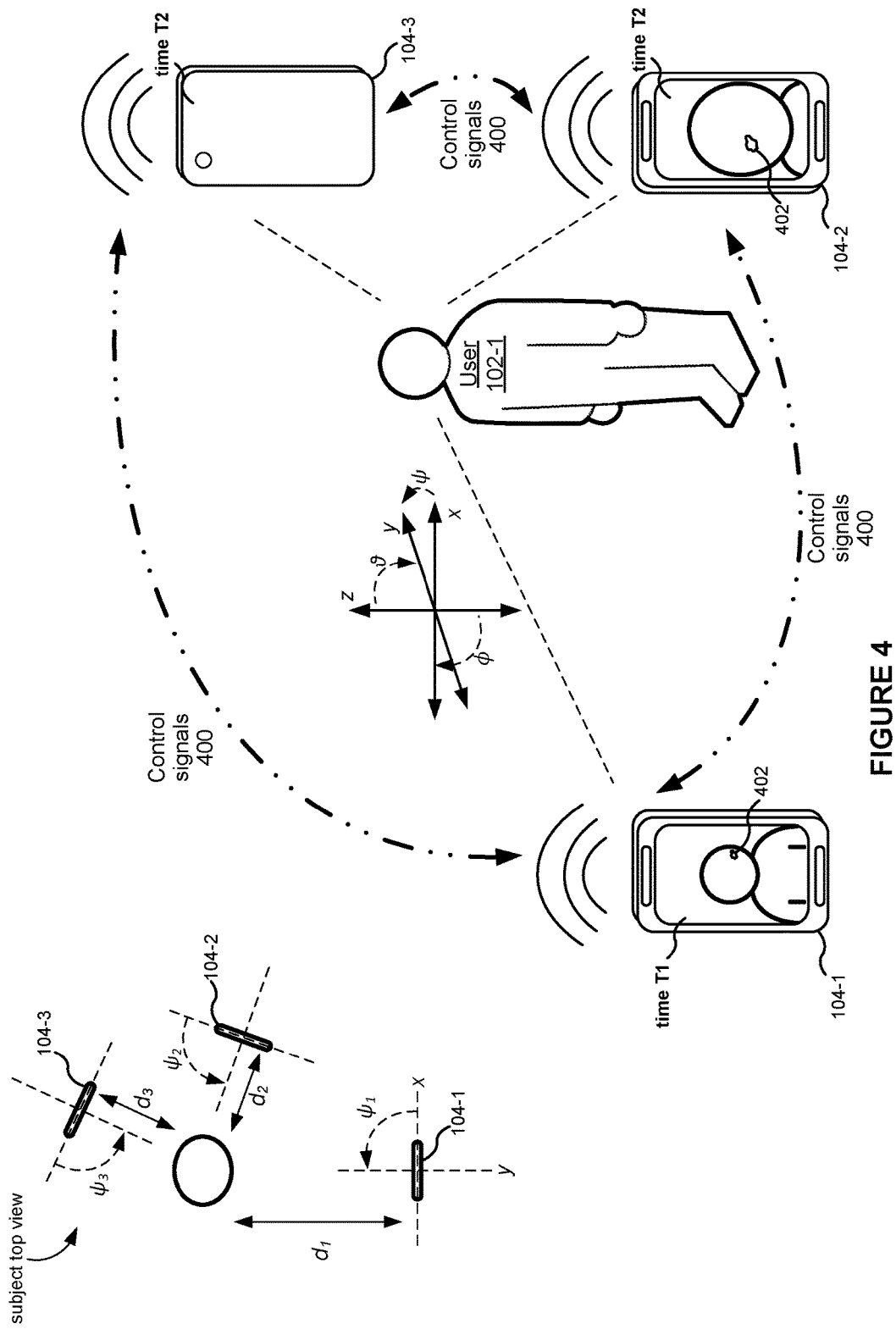
FIG. 4 illustrates an environment in which image data is captured for a subject using one or more client devices, in accordance with some embodiments.

FIG. 4 illustrates an environment in which image data is captured for a subject using one or more client devices 104, in accordance with some embodiments.

The environment shown in FIG. 4 includes client devices 104-1, 104-2, and 104-3 obtaining multiple images of a region of interest of a subject (user 102-1) at various times (e.g., time intervals T1 and T2), and associating meta data with the obtained images. One or more of the client devices 104 also generate and communicate control signals 400 to other client devices in order to manipulate the manner in subsequent image and meta data are captured. Images and meta data captured by the client devices 104 are subsequently consolidated (e.g., by processing device 108, FIG. 1), which may thereafter be used and processed for various analytical purposes. Although the client devices 104 are smart phones in the example illustrated, in other implementations the client devices 104 may be any electronic device with image capture capabilities (e.g., a camera, a PDA, etc.). Furthermore, while the subject is a live, biological subject (e.g., a human), the illustrated environment and processes described herein are also applicable to non-biological contexts (as described in greater detail with respect to FIGS. 5A-5F).

In the example shown, client devices 104 are used to capture respective workflows that include one or more still-frame images, video sequences, and/or audio recordings from one or more positions and orientations. Concurrently with image capture, client devices 104-1 also acquire and associate meta data with the obtained images. Meta data includes temporal information (e.g., indication of time interval for image capture), device information (e.g., unique device identifier), and sensor readings of various environmental conditions obtained from one or more sensors of the client device 104-1 (e.g., sensors 326, such as an accelerometer, gyroscope, barometer, etc.) from which positional and orientation data for a client device can be determined. An orientation of the client devices 104 is measured with respect to a reference orientation. In this example, orientations of the client devices are defined by an angle of rotation within the x-y axis (i.e., yaw (ψ)), an angle of rotation within the y-z axis (i.e., pitch (θ)), and an angle of rotation within the x-z axis (i.e., roll (φ)). Meta data is also based on and includes various time-stamped sensor readings obtained from one or more sensors of the client device 104-1 (e.g., sensors 326, such as an accelerometer, gyroscope, barometer, etc.). Other types of meta data are described in greater detail throughout.

In this example, during time interval T1, the client device 104-1 captures images of a facial region of the user 102-1 and associates respective meta data of the capture session with the captured images (e.g., position, orientation, timestamp, etc.). After the captured data has been processed (e.g., by the same client device 104-1 or remotely), the client device 104-1 generates control signals 400 based on an identified characteristic of the captured images or region of interest. As described in greater detail with respect to FIGS. 5A-5F, characteristics may correspond to features observable in captured images or regions of interest (e.g., specific portions of an image, objects observed in an image, etc.), or alternatively may correspond to, relate to, or indicate technical aspects of image data or respective meta data (e.g., image quality, completeness of image data, etc.). Generated control signals 400 based on an observed characteristic include instructions for manipulating the operational behavior of devices that execute the control signals (e.g., instructions for modifying capture parameters, instructions to capture additional images of a region of interest having insufficient image data, etc.). Control signals and various characteristics upon which they are based are described in greater detail with respect to FIGS. 5A-5F.

In this example, an observed characteristic of the captured facial region is a lesion 402 warranting further attention and analysis. Here, after identifying the characteristic, the client device 104-1 generates control signals 400 for execution by client devices 104-2 and 104-3 in order to capture additional image data of the observed lesion. In particular, client devices 104-2 and 104-3 are closer to the particular region of interest of the user 102-1, and therefore are better positioned than client device 104-1 for capturing more detailed and centered images of the observed lesion. After receiving and in accordance with the control signals 400, the client devices 104-2 and 104-3 obtain additional images and associate respective meta data during time interval T2. As illustrated, the images captured by client device 104-2 include an enlarged view of the region of interest and the lesion 402, and thus include image data better suited for further analysis with respect to the region of interest.

The use of multiple client devices 104 is advantageous for obtaining and acquiring comprehensive data, and ultimately for enabling an enhanced analytical approach to processing data. Multiple client devices may be used to capture images of a region of interest at different resolutions (e.g., a first workflow for low-resolution images, a second workflow for high-resolution images, etc.), and/or to capture image workflows representing distinct frequencies or frequency ranges of light (e.g., a first client device 104-1 configured to detect visible light frequencies, a second client device 104-2 configured to detect IR light frequencies).

Using the associated meta data, images captured by the client devices 104 are then consolidated (e.g., by a remote processing device 108, client device 104, etc.) for further processing, analysis, or display. Images may be temporally consolidated (e.g., to identify and display an observed change of a region of interest over time) and/or spatially consolidated (e.g., to generate a composite image view representing a region of interest based on different angles, distances, resolutions, spectral representations, etc.).

FIGS. 5A-5F are flow diagrams illustrating a method 500 for capturing and consolidating image data using multiple client devices 104 and dynamic control signals, in accordance with some embodiments. In some implementations, the method 500 is performed by one or more devices of one or more systems (e.g., client devices 104, processing device 108, etc. of an imaging system 100, FIGS. 1-3), or any combination thereof. Thus, in some implementations, the operations of the method 500 described herein are entirely interchangeable, and respective operations of the method 500 are performed by any one of the aforementioned devices and systems, or combination of devices and systems. For ease of reference, the methods herein will be described as being performed by a first client device (e.g., client device 104-1), a second client device (e.g., client device 104-2), and a processing device (e.g., processing device 108) of an environment (e.g., 100, FIG. 1). While parts of the methods are described with respect to a client device or a processing device, any operations or combination of operations of the method 500 may be performed by any electronic device having image capture/processing capabilities (e.g., a computer-enabled imaging device, such as a smart phone, a camera device, a computer-enabled imaging device, a PDA, etc.).

Although some steps of the method 500 are described with respect to either a first client device or a second client device (e.g., steps 502 through 566, FIGS. 5A-5E), any operations performed by the second client device (e.g., steps 568 through 580, FIG. 5F) may be performed in accordance with any of the embodiments described with respect to the first client device, and vice versa. Furthermore, any respective operations performed by the first and/or second client device may be performed additionally, alternatively, and/or concurrently with one another (e.g., concurrent obtaining of workflows). Moreover, any operations described with respect to the first and/or second client device may be analogously performed by one or more additional client devices of the imaging system 100 (or other devices/systems described herein, such as an additional mobile apparatuses), additionally, alternatively, and/or concurrently with the operations of the first and/or second client device. An example in which multiple client devices (e.g., client devices 104-1 through 104-3) are used for concurrent and varied data capture is illustrated in FIG. 4.

Steps of the method 500 described with respect to FIGS. 5A-5E correspond to instructions/programs stored in a memory or other computer-readable storage medium of a first client device (e.g., memory 306 of client device 104-1, FIGS. 1, 3, and 4). The steps are performed (502) at the first client device in a plurality of client devices. The first client device includes one or more processors (e.g., 302), a first two-dimensional pixilated detector (e.g., image/video capture module 332), and memory (e.g., memory 306) for storing one or more programs for execution by the one or more processors. Furthermore, the steps of the method 500 described with respect to FIG. 5F correspond to instructions/programs stored in a memory or other computer-readable storage medium of a second client device (e.g., memory 306 of client device 104-2, FIGS. 1, 3, and 4). The steps are performed (568) at the second client device in a plurality of client devices in accordance with one or more control signals received across a network (e.g., from the first client device). The second client device includes one or more processors (e.g., 302), a second two-dimensional pixilated detector (e.g., image/video capture module 332), and memory (e.g., memory 306) for storing one or more programs for execution by the one or more processors, the one or more programs executed in accordance with the one or more control signals received across the network. Optionally, the first and/or second client devices include one or more additional sensors (e.g., barometer, compass, light sensors, etc.) for acquiring additional sensor readings that may be used as additional mathematical variables in processing operations (e.g., for consolidating workflows).

As an overview of the method 500, in some embodiments, the first client device (e.g., 104-1, FIG. 4) obtains (504, FIG. 5A) a first workflow comprising a first plurality of time-stamped two-dimensional pixilated images of a region of interest of a subject during a first time interval. First meta data is associated (508) with the first workflow. The first client device generates (518, FIG. 5B) one or more control signals, wherein the one or more control signals are based at least in part on a characteristic of the first workflow or a characteristic of the region of interest measured by the first workflow. The one or more control signals are then communicated (560, FIG. 5D) to the second client device (e.g., 104-2, FIG. 4) in the plurality of client devices across a network. In accordance with the one or more control signals, the second client device obtains (570, FIG. 5E) a second workflow comprising a second plurality of time-stamped two-dimensional pixilated image of the region of interest at a second time interval. Second meta data is associated (576) with the second workflow. Subsequently and/or concurrently, the processing device, or any client device in the plurality of client devices, consolidates (584, FIG. 5F) the first and second workflow into a consolidated workflow for the region of interest using the first and second meta data. An exemplary environment in which the method 500 is performed is described with respect to FIG. 4. Various embodiments of the method 500 are described in greater detail below.

Figure 5A:
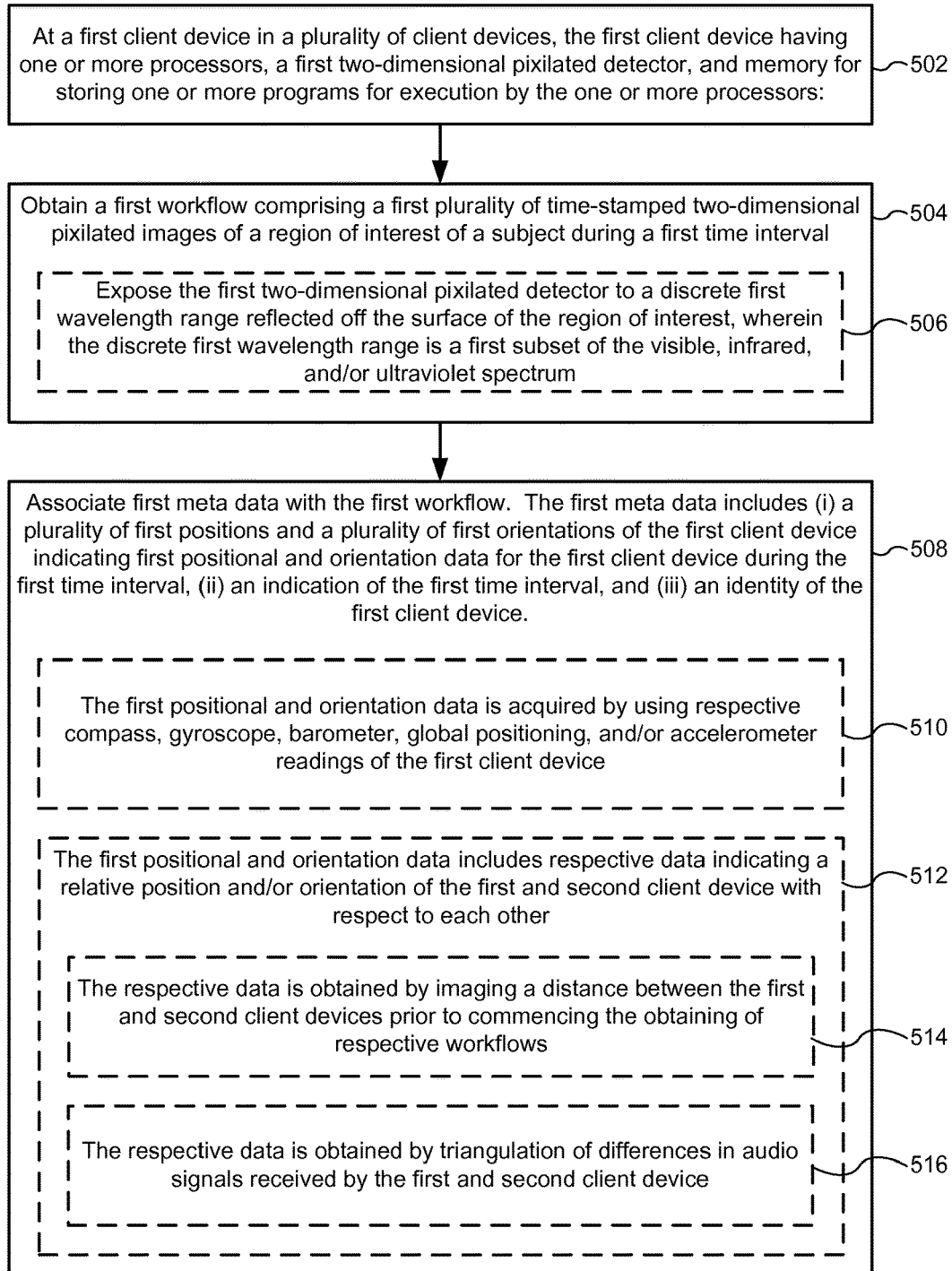

Referring now to FIG. 5A, the first client device (e.g., client device 104-1, FIG. 4) obtains (504) a first workflow comprising a first plurality of time-stamped two-dimensional pixilated images of a region of interest of a subject during a first time interval. A region of interest is a portion, feature, or any viewable aspect of a biological (e.g., a human, crop field, etc.) or non-biological (e.g., building surface, urban landscapes, environmental region, etc.) subject. An example is illustrated and described with respect to FIG. 4, where the client device 104-1 captures one or more images of a facial region of the user 102-1 during the time interval T1. Here, the region of interest may be the facial region of the user 102-1 in the medical context of analyzing a subject's skin condition.

In some embodiments, the first workflow is obtained in accordance with one or more image capture parameters (e.g., a frequency of image capture, capture duration, capture start/end time, configuration settings for captured images, such as an image resolution, zoom, focal length, etc.), where the parameters dictate how a respective client device (e.g., image/video capture module 332) captures image data. For example, in some embodiments, the first two-dimensional pixilated detector is exposed (506) to a discrete first wavelength range reflected off the surface of the region of interest, wherein the discrete first wavelength range is a first subset of the visible, infrared, and/or ultraviolet spectrum. In some embodiments, the obtaining (504) of the first workflow includes exposing the first two-dimensional pixilated detector to aligned-polarized light reflected off the surface of the region of interest. In some embodiments, images in the first plurality of time-stamped two-dimensional pixilated images are obtained (504) at a first frequency during the first time interval (e.g., 30 Hz).

In some embodiments, obtaining the first workflow includes exposing, at night time when ambient light is determined to be less than a threshold level, the first two-dimensional pixilated detector to a discrete first wavelength range reflected off a surface of the region of interest. The discrete first wavelength range is a subset of the visible spectrum, and the first client device further includes one or more filters configured with respect to the first wavelength range.

In some embodiments, the obtaining (504) is performed while the first client device is in a stationary and fixed position (e.g., mounted on a wall). In some embodiments, the first client device is mounted to a mobile apparatus (e.g., car, drone device), and the obtaining (504) is performed while the mobile apparatus is moving. In some embodiments, while obtaining a respective workflow and associating respective meta data, the mobile apparatus moves in accordance with pre-programmed control signals (e.g., a pre-programmed flight pattern stored in a drone device), or in accordance with control signals received in real-time (e.g., a user sending control signals to the mobile apparatus from a remote control device). In some embodiments, the first client device is airborne during the first time interval (e.g., mounted to an airborne drone device).

First meta data is associated (508) with the obtained first workflow. The first meta data includes (i) a plurality of first positions and a plurality of first orientations of the first client device indicating first positional and orientation data for the first client device during the first time interval, (ii) an indication of the first time interval, and (iii) an identity of the first client device. As referred to throughout, the obtaining of respective workflows and/or associating of respective meta data for a given interval of time is generally referred to as an act of data capture or a data capture session. In some embodiments, each image of the first workflow is associated with respective meta data (e.g., for a given image, associated meta data includes a time at which the given image was captured, a geographic location of the first client device at the time of capturing the given image, etc.). Other examples of associated meta data are described throughout (e.g., FIG. 3).

In some embodiments, orientation data includes roll, pitch, and yaw axis values with respect to a predefined axis (e.g., axis defined in FIG. 4). In some embodiments, the positional data (e.g., GPS coordinates) indicates a location of the first client device at a respective time at which an image of the first workflow was captured. In some embodiments, positional data includes a relative position of the first client device with respect to a coordinate system defined by an area that encloses the first environmental region (e.g., x-y coordinates of the client device 104-1 with respect to a predefined coordinate system, such as the coordinate system defined by the subject top view illustrated in FIG. 4). In some embodiments, the first positional and orientation data is acquired (510) by using respective compass, gyroscope, barometer, global positioning, and/or accelerometer readings of the first client device.

Figure 5B:
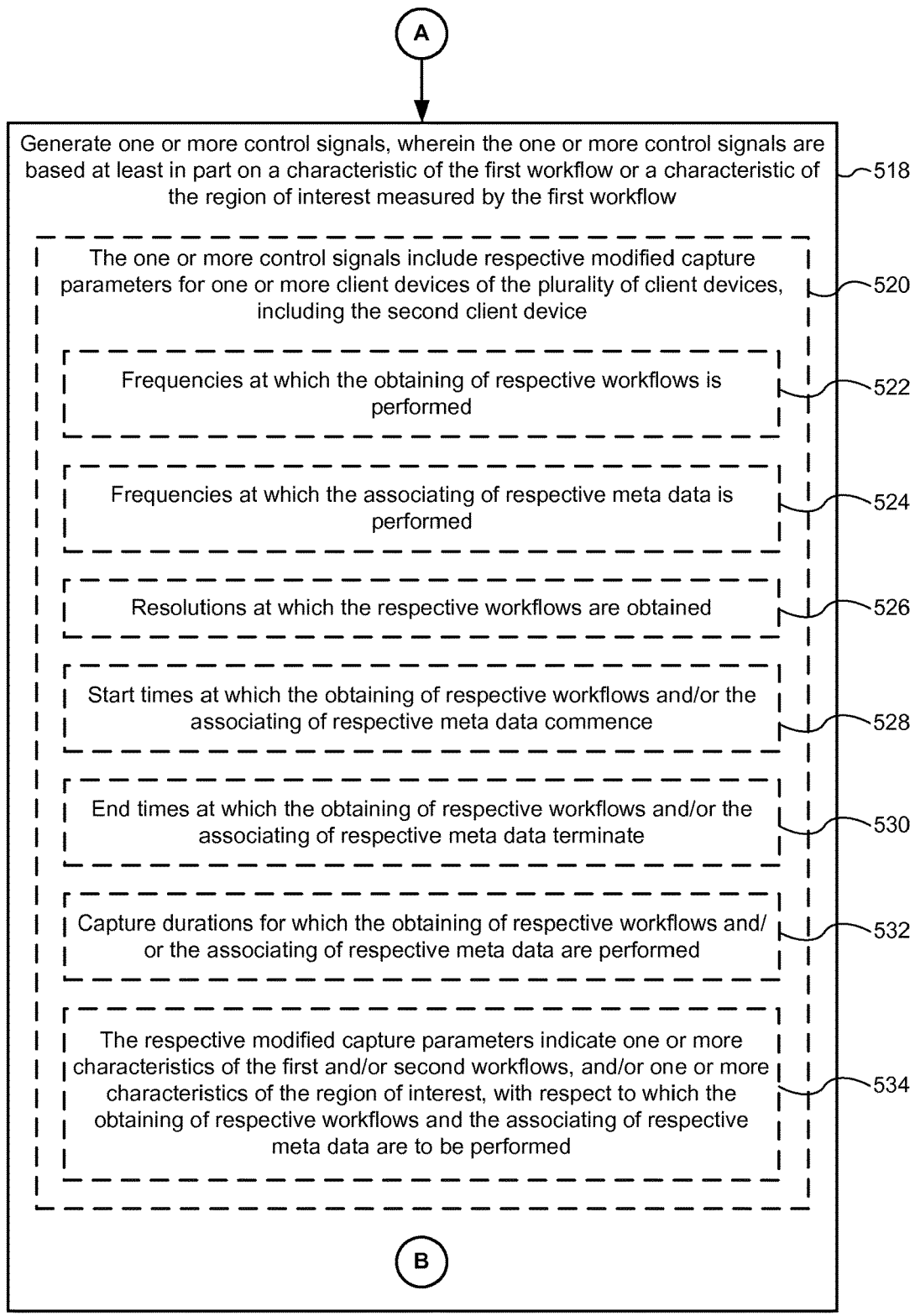
Figure 5D:
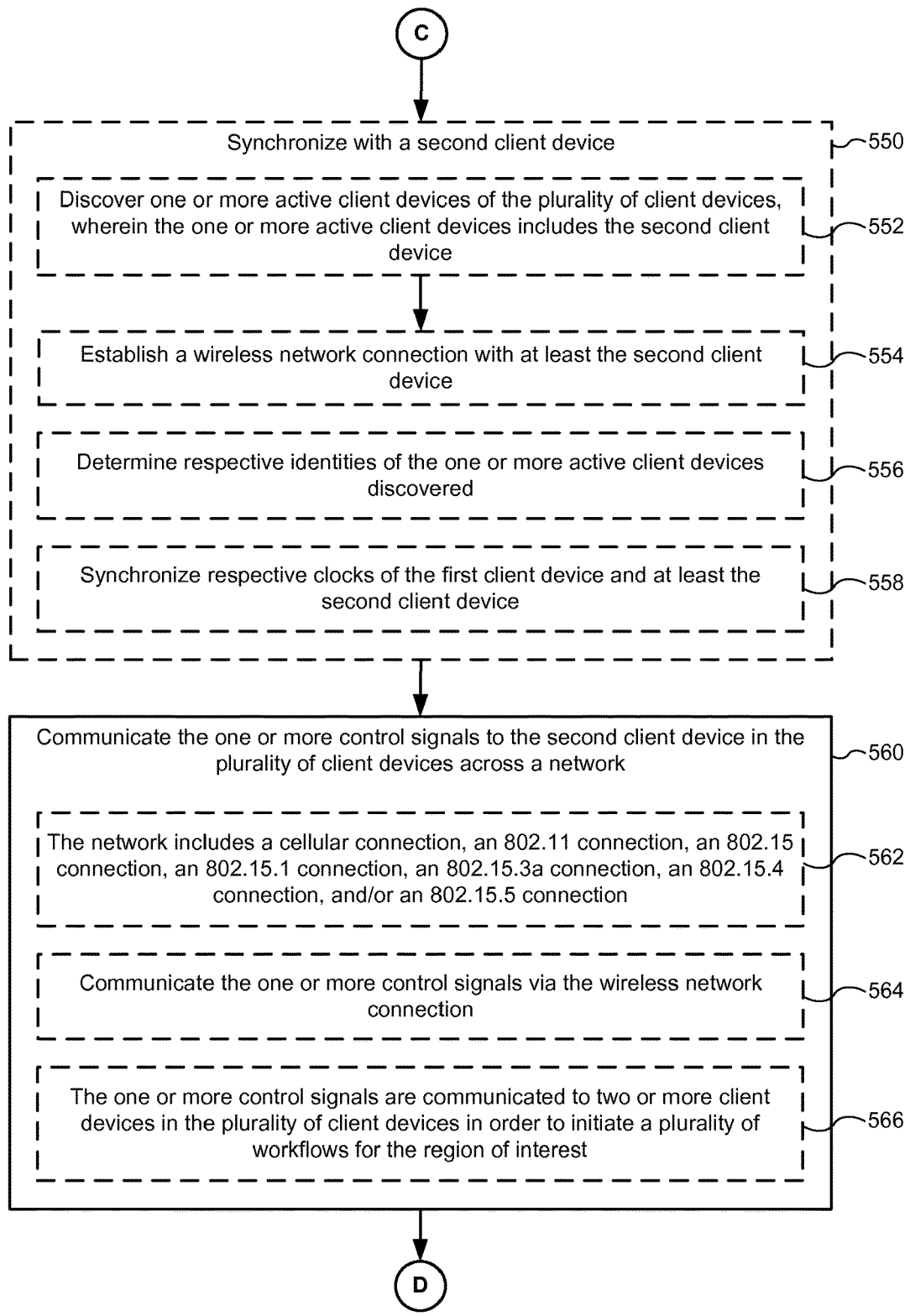
Figure 5E:
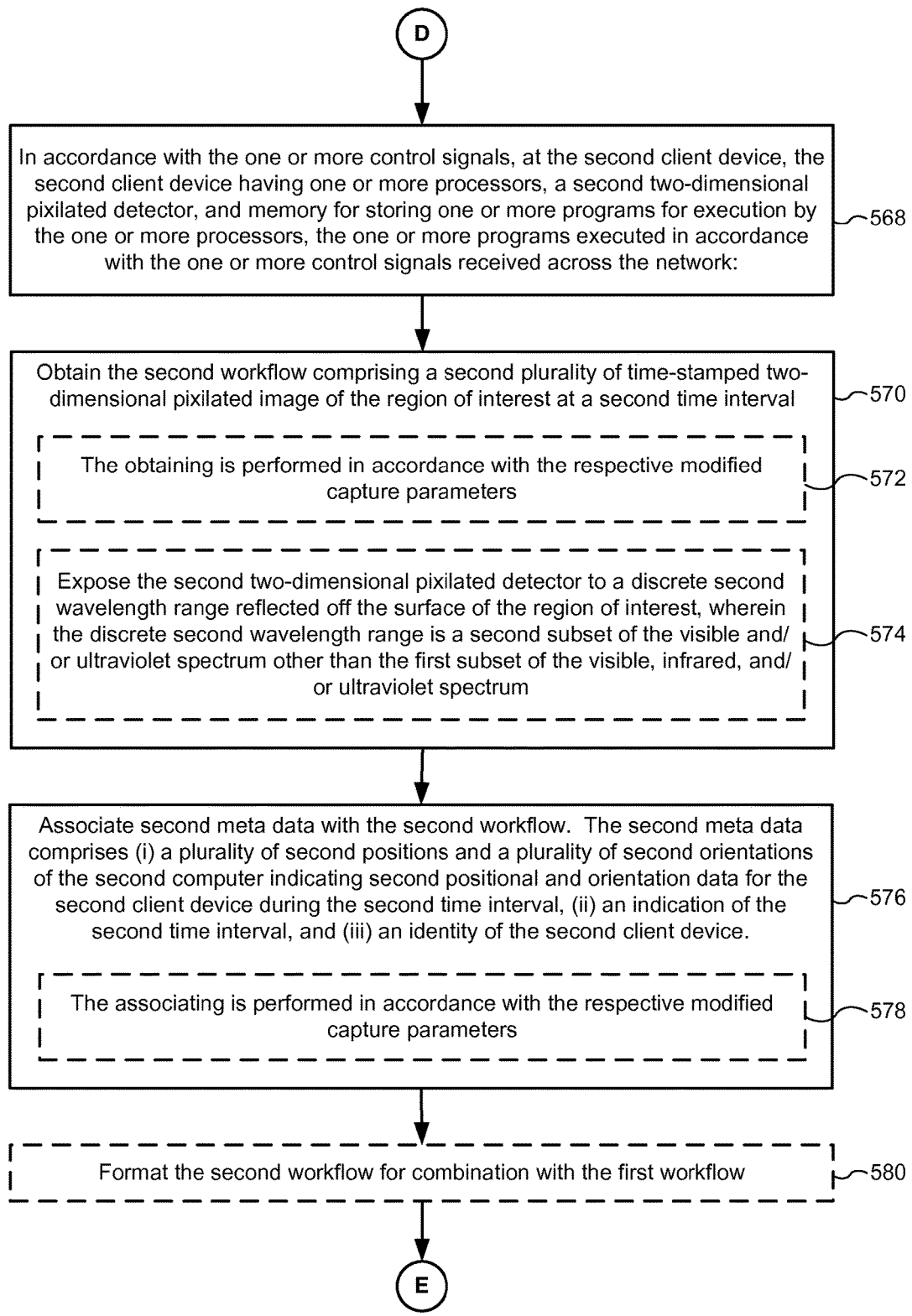

In some embodiments, the first positional and orientation data (and/or the second positional and orientation data for the second client device, 576, FIG. 5E) includes (512) respective data indicating relative positions and/or orientations of the first and second client devices (e.g., client device 104-2, FIG. 4) (and/or other client devices of the plurality of client devices) with respect to each other. In some embodiments, the respective positional and orientation data is obtained (514) by imaging a distance between the first and second client devices prior to commencing the obtaining of respective workflows. In some embodiments, the respective positional and orientation data is obtained (516) by triangulation of differences in audio signals received by the first and second client device. In some embodiments, the respective positional and orientation data is obtained by triangulation of differences in signals transmitted and received by transceivers of the first and second client devices (e.g., Bluetooth, Wi-Fi, cellular signals, etc.). In some embodiments, the respective positional and orientation data is obtained based on global positioning and/or satellite signals received by the first and second client devices.

Referring now to FIG. 5B, the first client device generates (518) one or more control signals, wherein the one or more control signals are based at least in part on a characteristic of the first workflow or a characteristic of the region of interest measured by the first workflow. Control signals include instructions for manipulating the manner in which devices (e.g., client devices, mobile apparatuses to which they are mounted, etc.) capture data (e.g., workflows, meta data, etc.). As discussed in greater detail below, the one or more control signals are subsequently communicated to the second client device (or other client devices) in the plurality of client devices across a network in order to dynamically influence the data capture operations of the second client device.

Characteristics correspond to features observable in captured images or regions of interest of a workflow. Characteristics may, for example, correspond to a specific portion or features of an image, or objects observed in the image/region of interest, for biological subjects (e.g., skin lesion, area of abnormal skin pigmentation, particular facial feature, insects/animals in a crop field, etc.) or non-biological subjects (e.g., urban landscape, building surface structure, etc.). Additionally and/or alternatively, characteristics correspond to, relate to, or indicate technical aspects or a status of image data or respective meta data for a workflow, such as a quality (e.g., clarity, sharpness, focus, color accuracy, etc.), completeness (e.g., missing, incomplete, or deficient image data/meta data of a region of interest), or resolution (e.g., resolution below a predefined threshold) of the captured image data or respective meta data.

Characteristics may be identified manually (e.g., portions of images selected by a user upon reviewing the captured images) or through image processing (e.g., performed by the remote processing device, the same client device that captured the image data, etc.). In some embodiments, characteristics are identified (and thus control signals are generated) in real-time (i.e., based on real-time image processing performed during the first time interval when the first workflow is being obtained), or alternatively, after a workflow (or a portion thereof) and respective meta data have been received and processed by a processing device, or any client device in the plurality of client devices (e.g., processing performed by processing device 108, the identified characteristics being sent to the client devices thereafter).

Generated control signals 400 based on an observed characteristic include instructions for manipulating the operational behavior of devices (e.g., client devices 104, mobile apparatuses to which they are mounted, etc.) that execute the control signals.

In some embodiments, the one or more control signals include (520) respective modified capture parameters for one or more client devices of the plurality of client devices, including the second client device (e.g., instructions for modifying existing capture parameters for the second client device). In some embodiments, the modified capture parameters include frequencies (522) at which the obtaining of respective workflows is performed (e.g., frequency of capturing images for a respective workflow), frequencies (524) at which the associating of respective meta data is performed (e.g., frequency at which accelerometer readings are sampled), and/or resolutions (526) at which the respective workflows are obtained. In some embodiments, the modified capture parameters include start times (528) at which the obtaining of respective workflows and/or the associating of respective meta data commence, end times (530) at which the obtaining of respective workflows and/or the associating of respective meta data terminate, and/or capture durations (532) for which the obtaining of respective workflows and/or the associating of respective meta data are performed. Capture parameters further include other device settings (e.g., for the client device or any of its components, such as a pixilated detector, sensor devices, etc. as described in FIG. 3) which affect resulting image or meta data.

In some embodiments, the respective modified capture parameters indicate (534) one or more characteristics of the first and/or second workflows, and/or one or more characteristics of the region of interest, with respect to which the obtaining of respective workflows and the associating of respective meta data are to be performed. The respective modified capture parameters may, for example, include different types of identifying information for the characteristic, such as location information (e.g., position of the characteristic in a coordinate system defined by an image of a workflow; geographic coordinates; positional and/or orientation data corresponding for orienting a client device with respect to the characteristic, such as a distance, height, angle, etc.) or other descriptive information (e.g., type of facial features, shape/color/size of an observed feature, etc.). In an example involving an aerially surveyed crop field, the modified capture parameters may include geographic coordinates of a region of the crop field exhibiting potential disease symptoms, for which additional higher resolution images are to be captured by the second client device.

In some embodiments, control signals include instructions for one or more parameters of a mobility pattern (e.g., to be executed by a mobile apparatus to which a client device is mounted, or alternatively a client device having mobile capabilities). Control signals include, but are not limited to, a speed (e.g., changing current speed, enabling variable speed, etc.), an altitude, an orientation (e.g., yaw, pitch, roll), a duration of mobility, a trajectory (e.g., linear, orbital), a flight line (e.g., a specific path/region over which a mobile apparatus spans), a position (e.g., a distance, angle, and/or other position-based parameter with respect to a region of interest/characteristic) and/or any other parameters affecting the mobile behavior of a mobile apparatus. In some embodiments, the one or more control signals include a pre-programmed set of instructions (e.g., corresponding to pre-defined parameters of a flight pattern to be executed, such as a flight line, speed, altitude, etc.). Alternatively, in some embodiments, the one or more control signals are based on user inputs detected within an instance of a control application (e.g., user inputs detected on a remote control device in a control module (client application module 340, FIG. 3), the user inputs corresponding to real-time directional commands for adjusting a roll, pitch, and/or yaw of an airborne device).

Referring now to FIG. 5C, in some embodiments, the one or more control signals (e.g., modified capture parameters and/or parameters of a mobility pattern) are commands for remedying (e.g., adjusting, correcting, compensating) an identified characteristic of the captured images or regions of interest. For example, in some embodiments, the one or more control signals include (536) instructions for causing the obtaining of respective workflows and the associating of respective meta data by the first client device and/or the second client device to be performed in accordance with one or more additional regions of interest of the subject corresponding to the characteristic upon which the one or more control signals were generated. In some embodiments, the one or more additional regions of interest include (538) regions of interest for which insufficient image data and/or meta data was captured by the first client device (e.g., insufficient image data captured for the first workflow as a result a device malfunction, environmental disturbance, etc.). In some embodiments, the instructions include (540) instructions for obtaining the respective workflows of the one or more additional regions of interest at an increased image resolution. Referring to the example illustrated in FIG. 4, the identified characteristic is a skin lesion 402 detected in a facial region of the user 102-1. Here, the control signals for execution by the client devices 104-2 and 104-3 during time interval T2 include both modified parameters of a mobility pattern instructing the client devices and/or mobile apparatuses to which they are mounted to be repositioned at a closer distance and a more centered orientation with respect to the skin lesion 402 (e.g., at distances d2 and d3 from the user 102-1, and from angles $\psi 2$ and $\psi 3$). The control signals may also include modified capture parameters for the client devices 104-2 and 104-3 for capturing additional images at an increased image resolution. As shown in FIG. 4, the image displayed on the client device 104-2 (captured during time interval T2, and captured in accordance with control signals 400 received from client device 104-1) shows an enlarged view of the lesion 402. In some embodiments, the first workflow includes one or more images in which views of the region of interest are obstructed (e.g., by an unexpected object or structure), and the one or more additional regions of interest correspond to unobstructed views of the region of interest (e.g., different angles, positions, vantage points, etc.).

In some embodiments, the one or more control signals include (542) instructions for causing the obtaining of respective workflows and the associating of respective meta data by the first client device and the second client device (respective steps of the second client device described with respect to FIG. 5E) to be performed synchronously. In some embodiments, synchronous performance includes respective generating and operating in accordance with control signals (e.g., modified capture parameters and/or parameters of a respective mobility pattern) for the first and second client devices (and other client devices of the plurality of client devices) that are the same (e.g., same capture start time and region of interest for all client devices), or at least partially distinct (e.g., same capture start time and duration, but different image resolutions).

In some embodiments, the one or more control signals include (546) instructions for causing obtaining of a second workflow to commence (e.g., a capture initiation command). In some embodiments, the one or more control signals include (548) instructions for causing the obtaining of the second workflow and associating of second meta data at a second client device to continue after the first client device ceases the obtaining of the first workflow and the associating of the first meta data. In this manner, a fleet of client devices can continuously chain and synchronize their operational capabilities so that the duration or comprehensiveness of data capture is optimized. As an example, a first client device may initiate a data capture session until its battery power or storage capacity is depleted, at which point a second client device receives a control signal to continue the data capture session from a point at which the first client device ended (e.g., the second client device continuing data capture from the last region of interest captured by the first client device, such as a point in an orbital trajectory encircling a subject).

In some embodiments, the one or more control signals are further dictated by a third workflow acquired by a third client device in the plurality of client devices, wherein the third workflow is acquired during or before the first time interval. Thus, by basing the control signals on data captured by another client device, the control signals can be further refined and targeted (e.g., identifying additional regions of interest having insufficient image data).

Referring now to FIG. 5D, in some embodiments, the first client device synchronizes (550) with a second client device (and/or other client devices in the plurality of client devices). In some embodiments, the synchronizing includes discovering (552) one or more active client devices of the plurality of client devices, wherein the one or more active client devices includes the second client device, and establishing (554) a wireless network connection (e.g., Bluetooth, Wi-Fi, etc.) with at least the second client device. By establishing the wireless network connection, client devices may transmit and receive signals (e.g., control signals, image data, meta data, etc.) to one another before, during, and/or after a data capture operation. In some embodiments, the synchronizing includes determining (556) respective identities of the one or more active client devices discovered (e.g., unique client device identifiers, MAC/IP addresses, etc.). In some embodiments, the synchronizing includes synchronizing (558) respective clocks of the first client device and at least the second client device. Synchronization of clocks ensures, for example, that data capture sessions performed by multiple client devices receiving the same control signals (e.g., a start/end time) are aligned.

The one or more control signals are communicated (560) to the second client device in the plurality of client devices across a network. Optionally, in some embodiments, the first client device and the second client device (or any other client devices) exchange captured data (e.g., portions of the obtained workflows/associated meta data) across the network concurrent with or after a data capture session (e.g., during the first time interval while the first client device is in flight). In some embodiments, the network includes (562) a cellular connection (e.g., GSM, CDMA), an 802.11 connection (e.g., Wi-Fi), an 802.15 connection (e.g., Bluetooth), an 802.15.1 connection, an 802.15.3a connection, an 802.15.4 connection, and/or 802.15.5 connection. In some embodiments, the one or more control signals are communicated (560) via the wireless network connection (established in step 554). In some embodiments, the one or more control signals are communicated (566) to two or more client devices in the plurality of client devices in order to initiate a plurality of workflows for the region of interest. Thus, for example, control signals (e.g., same start/end time, same capture frequency, positions, orientations, etc.) are sent to multiple client devices in order to synchronize data capture for a particular subject.

Referring now to FIG. 5E, in accordance with the one or more control signals (generated at step 518 in FIG. 5B, and received after step 560 in FIG. 5D), the second client device (e.g., client device 104-2, FIG. 4) obtains (570) the second workflow comprising a second plurality of time-stamped two-dimensional pixilated image of the region of interest at a second time interval.

In some embodiments in which the one or more control signals include instructions for parameters of a mobility pattern for a mobile apparatus (to which the second client device is mounted), obtaining (570) the second workflow includes the second client device sending the one or more control signals to the mobile apparatus for execution during the second time interval. For example, the second client device receives control signals from the first client device, which include instructions for modifying the flight pattern of a drone device to which the second client device is mounted. Here, the control signals may direct the drone device to reposition itself at a specified distance and location with respect to a crop field. The control signals are thereafter transmitted by the second client device (e.g., via a wired/wireless interface) to the drone device, which executes the control signals and repositions itself accordingly. Additionally and/or alternatively, the one or more control signals (e.g., instructions for modifying a mobility pattern) are communicated directly to the respective mobile apparatuses to which the client devices are affixed. In some embodiments, the second client device is airborne during the second time interval.

In some embodiments, the first time interval (during which the first workflow is obtained, 504, FIG. 5A) and the second time interval at least partially overlap. In other words, in some embodiments, during the first time interval the first client device executes a data capture session by obtaining a portion of the first workflow (e.g., a first image), and generates control signals based on characteristics of that captured portion of first workflow (or of the region of interest shown in the first workflow). During the first time interval, control signals are communicated to the second client device, which initiates its own data capture session during a second time interval by obtaining the second workflow in accordance with the control signals. Meanwhile, the first client device continues to carry out the data capture session (i.e., continues obtaining images for the first workflow) as the second client device also captures data. In other words, in some embodiments, generating the one or more control signals at the first client device is performed while obtaining the first workflow during the first time interval, and a portion of the first workflow and the second workflow are obtained concurrently in accordance with the one or more control signals.

In some embodiments, the obtaining is performed (572) in accordance with the respective modified capture parameters (520, FIG. 5B). For example, the received control signals may include an increased image resolution with which to capture image data, and the second client device accordingly obtains an image workflow using the increased resolution. Various capture parameters are described in greater detail with respect to FIG. 5B.

In some embodiments, the obtaining includes (574) exposing the second two-dimensional pixilated detector to a discrete second wavelength range reflected off the surface of the region of interest, wherein the discrete second wavelength range is a second subset of the visible and/or ultraviolet spectrum other than the first subset of the visible, infrared, and/or ultraviolet spectrum (step 506, FIG. 5A). In other words, the first and second client devices are configured to capture respective workflows corresponding to distinct frequencies or frequency ranges of light. In some embodiments, the obtaining of the second workflow includes exposing the second two-dimensional pixilated detector to a cross-polarized light returned from off the surface of the region of interest.

In some embodiments, images in the second plurality of time-stamped two-dimensional pixilated images are obtained (570) at a second frequency during the second time interval. In some embodiments, the first frequency (at which the first workflow is captured) is the same as the second frequency, while in other embodiments, the first frequency is different than the second frequency.

In some embodiments, the first client device further includes a third two-dimensional pixilated detector, and the second client device further includes a fourth two-dimensional pixilated detector. The first (502) and third two-dimensional pixilated detectors are oriented in substantially opposite directions, and the second (568) and fourth two-dimensional pixilated detectors are oriented in substantially opposite directions (e.g., a front-facing camera and a back-facing camera). The obtaining of respective workflows (e.g., step 504, FIG. 5A, and step 570, FIG. 5E), and the associating of respective meta data (e.g., step 508, FIG. 5A, and step 576, FIG. 5E) by the first and second client devices are by use of the first, second, third, and fourth two-dimensional pixilated detectors.

Second meta data is associated (576) with the second workflow. The second meta data comprises (i) a plurality of second positions and a plurality of second orientations of the second computer indicating second positional and orientation data for the second client device during the second time interval, (ii) an indication of the second time interval, and (iii) an identity of the second client device. Other examples of associated meta data are described with respect to the first client device and throughout. In some embodiments, the associating is performed (578) in accordance with the respective modified capture parameters (e.g., frequency at which accelerometer readings are sampled).

In some embodiments, the second workflow is formatted (480) for combination with the first workflow. Formatting may include, for example, matching timestamps for images of the first and second workflows (e.g., removing unmatched, extraneous images), matching aligned images (e.g., discarding images not having adjacent positional/orientation data), and/or other operations for spatially and/or temporally aligning images of the first and second workflows.

Figure 5F:
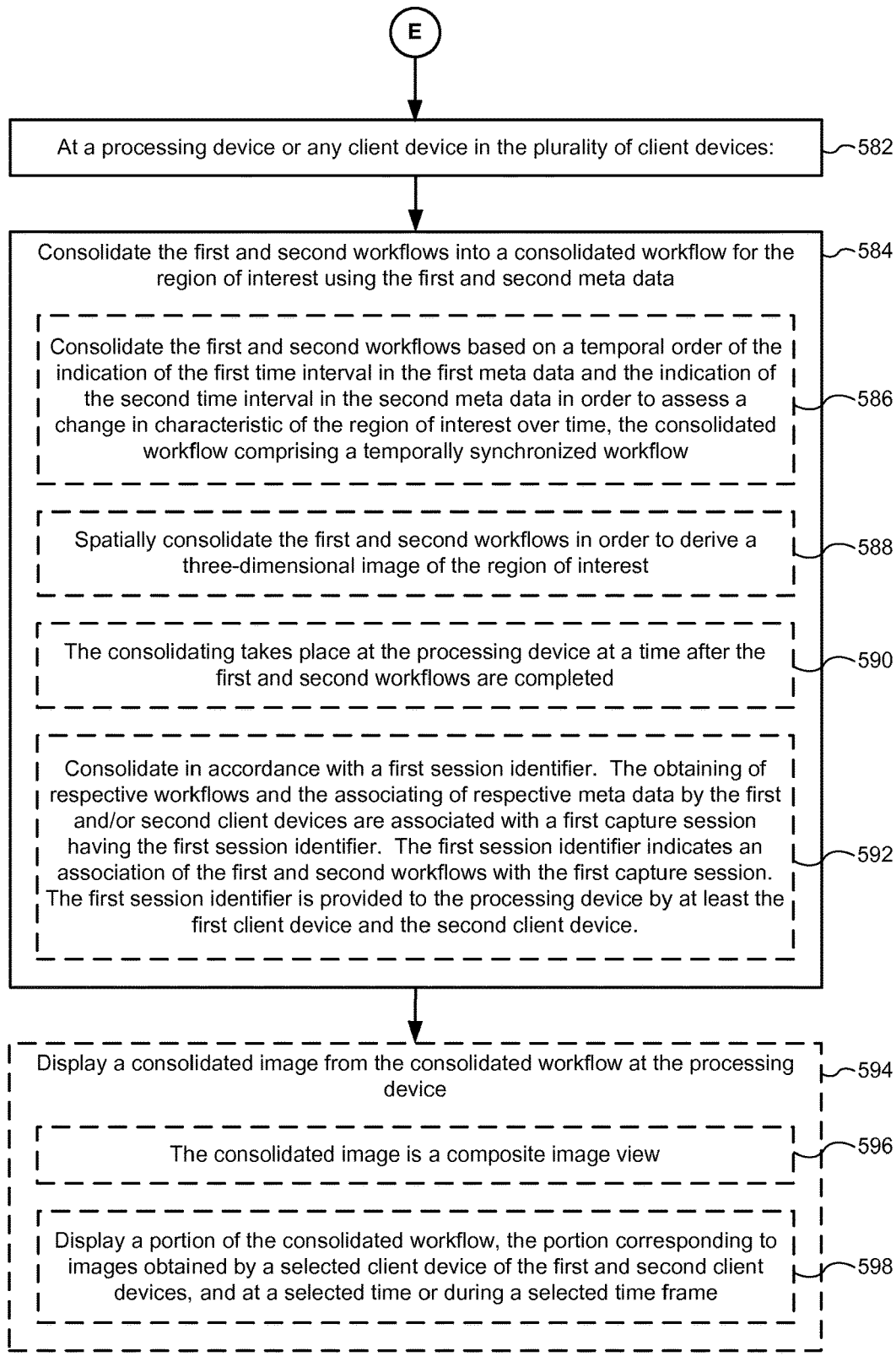

Steps of the method 500 described with respect to FIG. 5F correspond to instructions/programs stored in a memory or other computer-readable storage medium of a processing device (e.g., memory 206 of processing device 108, FIGS. 1 and 2) (additionally and/or alternatively, by one or more client devices of the plurality of client devices, such as client device 104-1 in FIGS. 1 and 3). The steps are performed (582) at the processing device or any client device in the plurality of client devices.

The processing device consolidates (584) the first and second workflows into a consolidated workflow for the region of interest using the first and second meta data. Consolidation of respective workflows captured by one or more client devices results in the generation of spatial, spectral, and/or temporal visual representations of captured data for the subject. For instance, a consolidated workflow enables a sporting event to be viewed from a wide variety of angles using distinctly positioned client devices that capture images for creating the consolidated workflow. In another example, police or military exercises can undergo multi-dimensional review (e.g., a composite image having a spatial and temporal visual representation, allowing images to be reviewed and manipulated with respect to space and time). As yet another example, the location, health, and quality of vegetation of feeding live stock could be actively monitored.

In some embodiments, the first and second workflows are consolidated (586) based on a temporal order of the indication of the first time interval in the first meta data and the indication of the second time interval in the second meta data in order to assess a change in characteristic of the region of interest over time, the consolidated workflow comprising a temporally synchronized image set. As an example, a first workflow for a crop field is captured by a first client device on a given day. Consolidating the first workflow with workflows captured on subsequent dates thus creates a consolidated workflow that represents and enables an assessment of changes in the crop field over time.

In some embodiments, the first and second workflows are spatially consolidated (588) in order to derive a three-dimensional image of the region of interest. In some embodiments, spatially consolidating includes matching a plurality of spatial features found in both the two-dimensional pixilated images of the first workflow and the two-dimensional pixilated images of the second workflow, and estimating a parallax between the spatial features using the first and second positional and orientation data. In some embodiments, spatial features whose estimated parallaxes satisfy a parallax threshold are added as points to a constructed two or three-dimensional map. Optionally, these constructed maps are then used to create dense point clouds and/or generate textured meshes representing a captured subject or region of interest.

In some embodiments, the consolidated workflow comprises a consolidated audio-visual set. That is, the first client device captures a first audio stream during the first time interval, and the second client device captures a second audio stream during the second time interval. Furthermore, the first workflow comprises a first video sequence and the second workflow comprises a second video sequence. The consolidated workflow includes a consolidated audio-visual set including the first and second video sequences and the first and second audio streams, where the consolidating (584) comprises synchronizing image and/or audio data of the first and second video sequences and/or the first and second audio streams.

In some embodiments, the consolidating takes place (590) at the processing device at a time after the first and second workflows are completed. Additionally and/or alternatively, the consolidating takes place concurrent with data capture (i.e., while obtaining respective workflows and associating respective meta data).

In some embodiments, the consolidating is performed (592) in accordance with a first session identifier. The obtaining of respective workflows and the associating of respective meta data by the first and/or second client devices are associated with a first capture session having the first session identifier (e.g., a unique string of text). The first session identifier therefore indicates an association of the first and second workflows with the first capture session. The first session identifier is provided to the processing device by at least the first client device and the second client device, and the consolidating is performed (592) in accordance with the first session identifier (e.g., grouping workflows corresponding to the same capture session). Session identifiers therefore enable the consolidation of related data based on a capture session during which they were obtained.

In some embodiments, a consolidated image from the consolidated workflow is displayed (594) at the processing device. In some embodiments, the consolidated image is (596) a composite image view (e.g., a view in which images from the first and second workflows are stitched together, the images being captured from different angles of a subject). In some embodiments, the consolidated workflow is provided for display on a virtual reality system (e.g., as an interactive 3D visualization).

In some embodiments, the displaying includes (598) displaying a portion of the consolidated workflow, the portion corresponding to images obtained by a selected client device of the first and second client devices, and at a selected time or during a selected time frame. Thus, a subset of the consolidated workflow corresponding to data captured by a particular client device, at a particular time, can be selectively displayed.

In some embodiments, two, three, or four-dimensional sets of data are extracted from the consolidated workflow for processing in other systems, integration into other three dimensional virtual environments, and/or exportation to three-dimensional printing or other three-dimensional rendering processes.

In some embodiments, a size of the region of interest, or a distance between the first or the second client device at a time when the first or the second client device was obtaining the respective first or second workflow, is derived. The deriving makes use of (i) the first positional and orientation data of the first client device during the first time interval and (ii) the second positional and orientation data of the second client device during the second time interval.

In some embodiments, the first meta data and the second meta data contain at least one characteristic selected from the group consisting of an ambient light meter reading, an audio stream, GPS coordinates, Wi-Fi triangulation coordinates, cellular base tower triangulation coordinates, FM radio wave triangulation coordinates, an accelerometer reading, and a barometric pressure reading. The consolidating of the first and second workflows into the consolidated workflow for the region of interest using the first and second meta data further includes using the at least one characteristic in the first meta data and the second meta data.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A computer-implemented method for consolidating imagery using a plurality of computer-enabled imaging devices:

at a first computer-enabled imaging device in the plurality of computer-enabled imaging devices, the first computer-enabled imaging device having one or more processors, a first two-dimensional pixilated detector, and memory for storing one or more programs for execution by the one or more processors:

obtaining a first workflow in accordance with one or more capture parameters, the first workflow comprising a first plurality of time-stamped two-dimensional pixilated images of a region of interest of a subject during a first time interval; and associating first meta data with the first workflow, wherein the first meta data comprises (i) a plurality of first positions and a plurality of first orientations of the first computer-enabled imaging device indicating first positional and orientation data for the first computer-enabled imaging device during the first time interval, (ii) an indication of the first time interval, and (iii) an identity of the first computer-enabled imaging device;

generating one or more control signals, wherein the one or more control signals are based at least in part on a characteristic of the first workflow or a characteristic of the region of interest captured by the first workflow,
communicating the one or more control signals to a second computer-enabled imaging device in the plurality of computer-enabled imaging devices across a network; and
at the second computer-enabled imaging device, the second computer-enabled imaging device having one or more processors, a second two-dimensional pixilated detector, and memory for storing one or more programs for execution by the one or more processors, the one or more programs executed in accordance with the one or more control signals received across the network:
in accordance with the one or more control signals:
obtaining a second workflow in accordance with one or more capture parameters, the second workflow comprising a second plurality of time-stamped two-dimensional pixilated image of the region of interest at a second time interval; and
associating second meta data with the second workflow, wherein the second meta data comprises (i) a plurality of second positions and a plurality of second orientations of the second computer indicating second positional and orientation data for the second computer-enabled imaging device during the second time interval, (ii) an indication of the second time interval, and (iii) an identity of the second computer-enabled imaging device; and
formatting the second workflow for combination with the first workflow; and
at a central system or any computer-enabled imaging device in the plurality of computer-enabled imaging devices:
generating a consolidated workflow for the region of interest by consolidating the first and second workflows using the first and second meta data, wherein the consolidated workflow comprises a visualization of the data of the first and second workflows.

2. The computer-implemented method of claim 1, wherein:
generating the one or more control signals at the first computer-enabled imaging device is performed while obtaining the first workflow during the first time interval; and
a portion of the first workflow and the second workflow are obtained concurrently in accordance with the one or more control signals.

3. The computer-implemented method of claim 1, wherein the one or more control signals are further dictated by a third workflow acquired by a third computer-enabled imaging device in the plurality of computer-enabled imaging devices, wherein the third workflow is acquired during or before the first time interval.

4. The computer-implemented method of claim 1, wherein the one or more control signals are communicated to two or more computer-enabled imaging devices in the plurality of computer-enabled imaging devices in order to initiate a plurality of workflows for the region of interest.

5. The computer-implemented method of claim 1, wherein the consolidating takes place at the central system at a time after the first and second workflows are completed.

6. The computer-implemented method of claim 1, wherein the first computer-enabled imaging device is airborne during the first time interval and the second computer-enabled imaging device is airborne during the second time interval.

7. The computer-implemented of claim 1, further comprising:
at the first computer-enabled imaging device, before communicating the one or more control signals:
synchronizing with the second computer-enabled imaging device, wherein the synchronizing comprises:
discovering one or more active computer-enabled imaging devices of the plurality of computer-enabled imaging devices, wherein the one or more active computer-enabled imaging devices includes the second computer-enabled imaging device; and
establishing a wireless network connection with at least the second computer-enabled imaging device,
wherein the one or more control signals are communicated to at least the second computer-enabled imaging device via the wireless network connection.

8. The computer-implemented method of claim 7, wherein the synchronizing further comprises determining respective identities of the one or more active computer-enabled imaging devices discovered.

9. The computer-implemented method of claim 7, wherein the synchronizing further comprises synchronizing respective clocks of the first computer-enabled imaging device and at least the second computer-enabled imaging device.

10. The computer-implemented of claim 1, wherein the one or more control signals include instructions for causing the obtaining of the second workflow to commence.

11. The computer-implemented method of claim 1, wherein the one or more control signals include instructions for causing the obtaining of the second workflow and the associating of the second meta data at the second computer-enabled imaging device to continue after the first computer-enabled imaging device ceases the obtaining of the first workflow and the associating of the first meta data.

12. The computer-implemented method of claim 1, wherein the one or more control signals include respective modified capture parameters for one or more computer-enabled imaging devices of the plurality of computer-enabled imaging devices, including the second computer-enabled imaging device,
wherein obtaining respective workflows and associating respective meta data by the one or more computer-enabled imaging devices are performed in accordance with the respective modified capture parameters.

13. The computer-implemented method of claim 12, wherein the respective modified capture parameters include:
respective frequencies at which the obtaining of respective workflows is performed,
respective frequencies at which the associating of respective meta data is performed; and/or
respective resolutions at which the respective workflows are obtained.

14. The computer-implemented method of claim 12, wherein the respective modified capture parameters include:
respective start times at which the obtaining of respective workflows and/or the associating of respective meta data commence;
respective end times at which the obtaining of respective workflows and/or the associating of respective meta data terminate; and/or
respective capture durations for which the obtaining of respective workflows and/or the associating of respective meta data are performed.

15. The computer-implemented of claim 12, wherein the respective modified capture parameters indicate one or more characteristics of the first and/or second workflows, and/or one or more characteristics of the region of interest, with respect to which the obtaining of respective workflows and the associating of respective meta data are to be performed.

16. The computer-implemented method of claim 1, wherein the one or more control signals include instructions for causing the obtaining of respective workflows and the associating of respective meta data by the first computer-enabled imaging device and the second computer-enabled imaging device to be performed synchronously.

17. The computer-implemented of claim 1, wherein the one or more control signals include instructions for causing the obtaining of respective workflows and the associating of respective meta data by the first computer-enabled imaging device and/or the second computer-enabled imaging device to be performed in accordance with one or more additional regions of interest of the subject corresponding to the characteristic upon which the one or more control signals were generated.

18. The computer-implemented method of claim 17, wherein the one or more additional regions of interest include regions of interest for which insufficient image data and/or meta data was captured by the first computer-enabled imaging device.

19. The computer-implemented method of claim 17, wherein the instructions for causing the obtaining of respective workflows and the associating of respective meta data include instructions for obtaining the respective workflows of the one or more additional regions of interest at an increased image resolution.

20. The computer-implemented method of claim 1, wherein the first and second positional and orientation data are acquired by using respective compass, gyroscope, barometer, global positioning, and/or accelerometer readings of the first and second computer-enabled imaging devices.

* * * * *